(12) United States Patent
Choi et al.

(10) Patent No.: US 9,599,375 B2
(45) Date of Patent: Mar. 21, 2017

(54) MAGNETIC COOLING APPARATUS

(71) Applicant: SAMSUNG ELECTRONICS CO., LTD., Suwon-si, Gyeonggi-do (KR)

(72) Inventors: Woo Hyek Choi, Yongin (KR); Il Ju Mun, Suwon (KR); Keon Kuk, Yongin (KR); Min Soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 14/657,097

(22) Filed: Mar. 13, 2015

(65) Prior Publication Data

US 2015/0260433 A1    Sep. 17, 2015

(30) Foreign Application Priority Data

Mar. 13, 2014    (KR) .................. 10-2014-0029822

(51) Int. Cl.
*F25B 21/02*    (2006.01)
*F25B 21/00*    (2006.01)

(52) U.S. Cl.
CPC ...... *F25B 21/00* (2013.01); *F25B 2321/0022* (2013.01); *Y02B 30/66* (2013.01)

(58) Field of Classification Search
CPC .... F25B 21/00; F25B 2321/0021; F25B 9/14; F25B 9/145; Y02B 30/66
USPC .............................................. 62/3.1, 6, 467
See application file for complete search history.

(56) References Cited

U.S. PATENT DOCUMENTS

| | | | | |
|---|---|---|---|---|
| 4,507,927 A | * | 4/1985 | Barclay | F25B 21/00 505/889 |
| 4,702,090 A | * | 10/1987 | Barclay | F25B 21/00 62/3.3 |
| 5,024,059 A | * | 6/1991 | Noble | F25B 1/00 62/3.1 |
| 5,249,424 A | * | 10/1993 | DeGregoria | F25B 21/00 62/3.1 |
| 5,887,449 A | * | 3/1999 | Pecharsky | F25B 21/00 62/3.1 |
| 2011/0302931 A1 | * | 12/2011 | Sohn | F25D 19/006 62/3.1 |

FOREIGN PATENT DOCUMENTS

KR    10-2006-0123118    12/2006
KR    10-2009-0102807    9/2009

* cited by examiner

*Primary Examiner* — Melvin Jones
(74) *Attorney, Agent, or Firm* — Staas & Halsey LLP

(57) ABSTRACT

A magnetic cooling apparatus includes first magnetic regenerators that pass a first heat transfer fluid and a first magnetocaloric material, second magnetic regenerators that pass a second heat transfer fluid having a relative lower freezing point than the first heat transfer fluid and a second magnetocaloric material having a relative lower Curie temperature than the first magnetocaloric material, a magnet that applies a magnetic field to the first magnetic regenerators and the second magnetic regenerators, a hot side heat exchanger allowing the first heat transfer fluid to emit heat, a cold side heat exchanger allowing the second heat transfer fluid to absorb heat, and an intermediate heat exchanger allowing the first heat transfer fluid flowing between cold sides of the first magnetic regenerators and the second heat transfer fluid passing through hot sides of the second magnetic regenerators to exchange heat with each other.

20 Claims, 9 Drawing Sheets

MAGNETIC COOLING APPARATUS

CROSS-REFERENCE TO RELATED APPLICATIONS

This application claims the benefit of Korean Patent Application No. 10-2014-0029822, filed on Mar. 13, 2014 in the Korean Intellectual Property Office, the disclosure of which is incorporated herein by reference.

BACKGROUND

1. Field

Embodiments of the present disclosure relate to a magnetic cooling apparatus using a magnetocaloric effect of magnetocaloric materials.

2. Description of the Related Art

A magnetic cooling apparatus is configured to use a feature of magnetocaloric materials, which generates heat when a magnetic field is applied, and absorbs heat when the magnetic field is removed. In addition, the magnetic cooling apparatus may replace conventional cooling apparatuses which use an air compression cycle.

Generally, a magnetic cooling apparatus includes a magnetic regenerator including magnetocaloric materials, a magnet applying a magnetic field to or removing a magnetic field from the magnetic regenerator, and a heat exchanger in which heat transfer fluid passed through the magnetic regenerator absorbs heat from the outside or emits heat to the outside.

In a process in which a magnetic field is applied to or removed from a magnetic regenerator, and a process of heat transfer fluid moving back and forth according to motion of a magnetic field being applied to or removed from a magnetic regenerator, a hot side and a cold side having a relatively lower temperature than that of the hot side are formed respectively at both ends of the magnetic regenerator.

A temperature difference between the hot side and the cold side is directly proportional to a cooling capacity of the magnetic cooling apparatus, so an arrangement of the magnetic regenerator capable of maximizing the temperature difference between the hot side and the cold side is required.

SUMMARY

Therefore, it is an aspect of the present disclosure to provide a magnetic cooling apparatus provided with a structure capable of improving a cooling capacity.

Additional aspects of the present disclosure will be set forth in part in the description which follows and, in part, will be obvious from the description, or may be learned by practice of the invention.

In accordance with one aspect of the present disclosure, a magnetic cooling apparatus includes a plurality of first magnetic regenerators, a plurality of second magnetic regenerators, at least one magnet, at least one hot side heat exchanger, at least one cold side heat exchanger, and an intermediate heat exchanger. The plurality of first magnetic regenerators may be configured to pass through a first heat transfer fluid and includes a first magnetocaloric material. The plurality of second magnetic regenerators may be configured to pass through a second heat transfer fluid having a relative lower freezing point than that of the first heat transfer fluid and includes a second magnetocaloric material having a relative lower Curie temperature than that of the first magnetocaloric material. The at least one magnet may be configured to apply or remove a magnetic field to or from the plurality of first magnetic regenerators and the plurality of second magnetic regenerators. The at least one hot side heat exchanger may allow the first heat transfer fluid receiving heat from the plurality of the first magnetic regenerators to emit heat. The at least one cold side heat exchanger may allow the second heat transfer fluid transferring heat to the plurality of the second magnetic regenerators to absorb heat. The intermediate heat exchanger may allow the first heat transfer fluid flowing between cold sides of the plurality of the first magnetic regenerators and the second heat transfer fluid passed through hot sides of the plurality of the second magnetic regenerators to exchange heat with each other.

The magnetic cooling apparatus may further include a first fluid transfer device disposed between the plurality of the first magnetic regenerators and reciprocally transferring the first heat transfer fluid in a first direction and a second direction opposite to the first direction, and a second fluid transfer device disposed between the plurality of the second magnetic regenerators and reciprocally transferring the second heat transfer fluid in a first direction and a second direction opposite to the first direction.

The first heat transfer fluid and the second heat transfer fluid may be transferred in directions opposite to each other in the intermediate heat exchanger.

The plurality of first magnetic regenerators may be provided in a pair arranged in parallel to each other, and the plurality of second magnetic regenerators may be provided in a pair arranged in parallel to each other, wherein one of a pair of the first magnetic regenerators and one of a pair of the second magnetic regenerators may be disposed in a row and the other of the pair of the first magnetic regenerators and the other of the pair of the second magnetic regenerators may be disposed in a row.

The magnet may apply or remove a magnetic field to or from both of the first magnetic regenerator and the second magnetic regenerator arranged in a row.

When a magnetic field is simultaneously applied to the first magnetic regenerator and the second magnetic regenerator arranged in a row, the first heat transfer fluid may be transferred in the first direction, and when a magnetic field is simultaneously removed from the first magnetic regenerator and the second magnetic regenerator arranged in a row, the first heat transfer fluid may be transferred in the second direction opposite to the first direction.

The first magnetic regenerator may include an accommodation unit in which the first magnetocaloric material is accommodated, a connecting unit communicating with both ends of the accommodation unit to allow the first heat transfer fluid to flow to an inside of the accommodation unit and at least one insulation unit configured to surround the accommodation unit to reduce heat exchange between an outside of the first magnetic regenerator and the accommodation unit.

The insulation unit may include at least one of a polymer layer, a polystyrene layer, a vacuum layer, and an air layer.

The connecting unit may be formed of at least one of a polymer and polystyrene.

The magnetic cooling apparatus may include a first temperature controlling device coupled to an outer surface of the first magnetic regenerator to apply heat to the first magnetocaloric material and a second temperature controlling device coupled to an outer surface of the second magnetic regenerator to absorb heat from the second magnetocaloric material.

The first temperature controlling device and the second temperature controlling device may be a Peltier element.

In accordance with another aspect of the present disclosure, a magnetic cooling apparatus includes a first magnetic regenerating unit provided with a plurality of first magnetic regenerators including a first magnetocaloric material, a second magnetic regenerating unit provided with a plurality of second magnetic regenerators including a second magnetocaloric material having a different Curie temperature from a Curie temperature of the first magnetocaloric material, at least one magnet configured to apply or remove a magnetic field to or from the plurality of first magnetic regenerators and the plurality of second magnetic regenerators and an intermediate heat exchanger disposed between the first magnetic regenerating unit and the second magnetic regenerating unit to allow the first magnetocaloric material and the second magnetocaloric material to exchange heat.

The intermediate heat exchanger may be disposed between a cold side of the first magnetic regenerating unit and a hot side of the second magnetic regenerating unit.

The first magnetic regenerating unit and the second magnetic regenerating unit may be separately controlled.

The first heat transfer fluid and the second heat transfer fluid may be transferred in directions opposite to each other.

In accordance with another aspect of the present disclosure, a magnetic cooling apparatus includes a magnetic regenerator configured to flow heat transfer fluid and a magnet configured to apply or remove a magnetic field to or from the magnetic regenerator. The magnetic regenerator may include an accommodation unit in which magnetocaloric material emitting heat when a magnetic is applied and absorbing heat when a magnetic field is removed is accommodated, a connecting unit communicating with both ends of the accommodation unit to allow the heat transfer fluid to be introduced to the inside of the accommodation unit, and at least one insulation unit configured to surround the accommodation unit to reduce exchanging heat between the outside of the magnetic regenerator and the accommodation unit.

In accordance with another aspect of the present disclosure, a magnetic cooling apparatus includes a magnetic regenerator configured to flow heat transfer fluid and a magnet configured to apply or remove a magnetic field to or from the magnetic regenerator. The magnetic regenerator may include a body, an accommodation unit in which magnetocaloric material emitting heat when a magnetic is applied and absorbing heat when a magnetic field is removed is accommodated, a connecting unit communicating with both ends of the accommodation unit to allow the heat transfer fluid to be introduced to the inside of the accommodation unit, and at least one temperature controlling device coupled to the outer surface of the body to apply or remove heat to or from the magnetocaloric material.

The above-described embodiments of the present invention are intended as examples, and all embodiments of the present invention are not limited to including the features described above.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION OF THE PREFERRED EMBODIMENTS

Reference will now be made in detail to embodiments of the present disclosure, examples of which are illustrated in the accompanying drawings.

Figure 1:
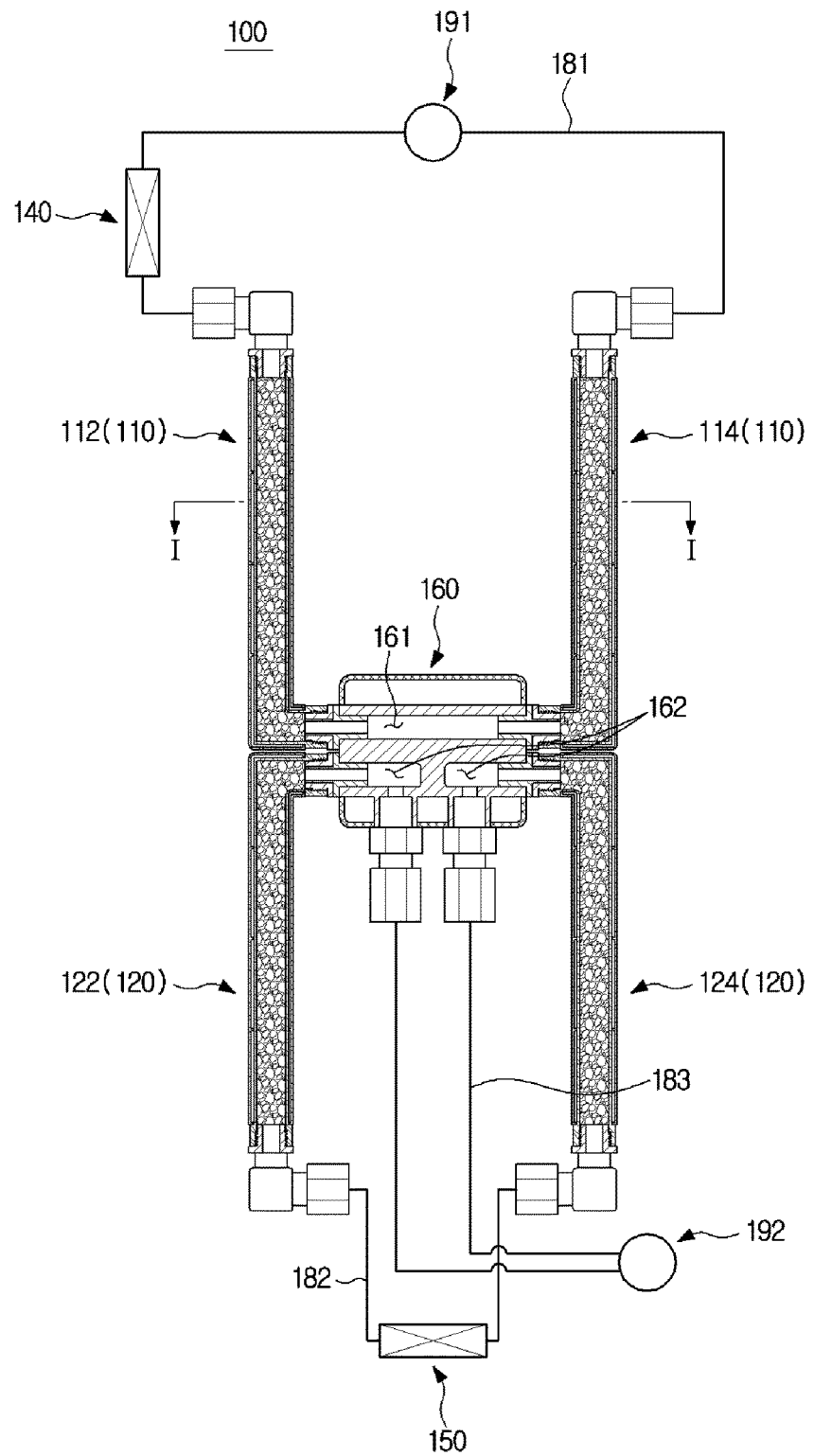
FIG. 1 is a view illustrating a magnetic cooling apparatus in accordance with one embodiment of the present disclosure.
Figure 2:
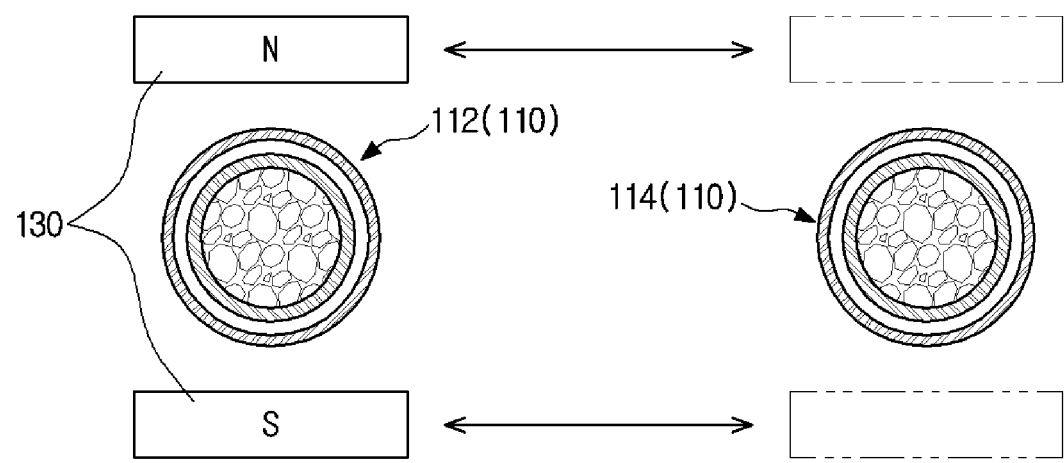
FIG. 2 is a cross-sectional view taken along line I-I of FIG. 1.
Figure 3A:
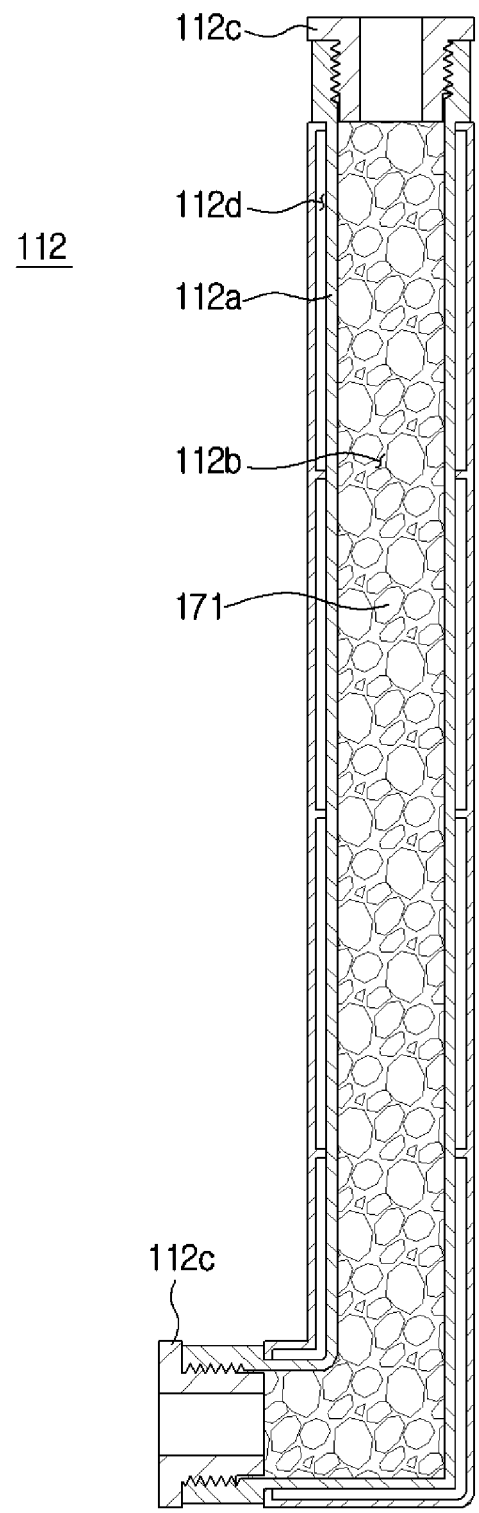
FIG. 3A is a cross-sectional view illustrating a first magnetic cooling apparatus in accordance with one embodiment of the present disclosure.
Figure 3B:
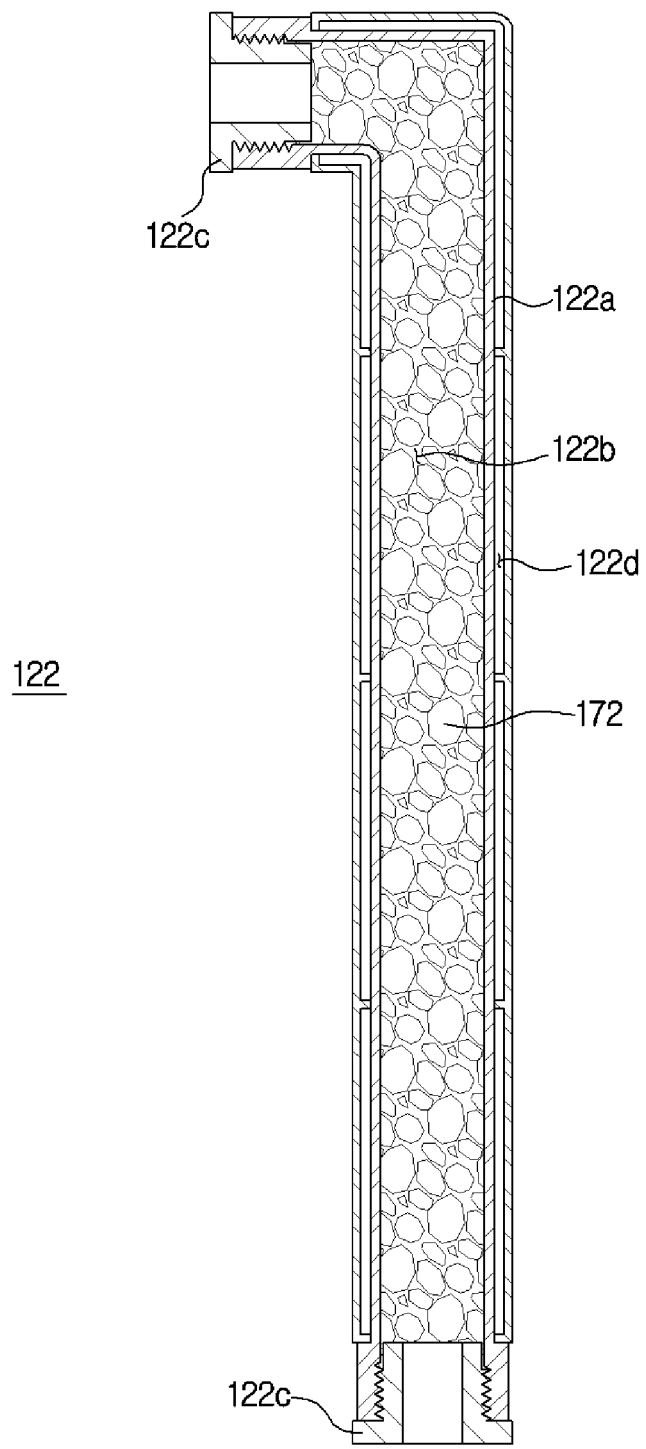
FIG. 3B is a cross-sectional view illustrating a second magnetic cooling apparatus in accordance with one embodiment of the present disclosure.

FIG. 1 is a view illustrating a magnetic cooling apparatus in accordance with one embodiment of the present disclosure, FIG. 2 is a cross-sectional view taken along line I-I of FIG. 1, FIG. 3A is a cross-sectional view illustrating a first magnetic cooling apparatus in accordance with one embodiment of the present disclosure, and FIG. 3B is a cross-sectional view illustrating a second magnetic cooling apparatus in accordance with one embodiment of the present disclosure. A magnet is omitted in FIG. 1.

As illustrated in FIGS. 1 and 2, a magnetic cooling apparatus 100 includes a first magnetic regenerating unit 110 and a second magnetic regenerating unit 120 disposed to exchange heat with each other, a magnet 130 applying or removing a magnetic field to or from the first magnetic regenerating unit 110 and the second magnetic regenerating unit 120, a hot side heat exchanger 140 in which a first heat transfer fluid F1 (refer to FIG. 5) emits heat, a cold side heat exchanger 150 in which a second heat transfer fluid F2 (refer to FIG. 5) absorbs heat, and an intermediate heat exchanger 160 disposed between the first magnetic regenerating unit 110 and the second magnetic regenerating unit 120 so that the first magnetic regenerating unit 110 and the second magnetic regenerating unit 120 exchange heat.

The first magnetic regenerating unit 110 includes a pair of first magnetic regenerators 112 and 114 which are arranged in parallel to each other. The pair of first magnetic regenerators 112 and 114 has the same structure, so hereinafter the description thereof will be described in focus on one single first magnetic regenerator 112.

As illustrated in FIG. 3A, the first magnetic regenerator 112 includes a cylinder-shaped body 112a, and an accommodation unit 112b formed inside the body 112a in a longitudinal direction of the body 112a. The accommodation unit 112b is filled with a first magnetocaloric material 171.

A connecting unit 112c is coupled to both ends of the accommodation unit 112b, respectively. The connecting unit 112c may be formed of high molecular mass compounds, such as polymer, polystyrene and the like. High molecular mass compounds, such as polymer, polystyrene and the like have high insulating efficiency since a thermal conductivity of the high molecular mass compounds is relatively higher than that of metal materials. Therefore, the heat loss generated by exchanging heat between the first magnetic regenerator 112 and the outside in the both ends of the first magnetic regenerator 112 is reduced so that a cooling capacity of the magnetic cooling apparatus 100 will be improved.

An insulation unit 112d is disposed between the body 112a and the accommodation unit 112b. The insulation unit 112d surrounds the accommodation unit 112b and may be formed of materials having low thermal conductivity, such as a polymer layer, a polystyrene layer, a vacuum layer, an air layer and the like. Therefore, the heat loss generated by exchanging heat between a cylindrical surface of the first magnetic regenerator 112 and the outside is reduced so that a cooling capacity of the magnetic cooling apparatus 100 will be improved.

The second magnetic regenerating unit 120 includes a pair of second magnetic regenerators 122 and 124 which are arranged in parallel to each other. A left second magnetic regenerator 122 between the pair of second magnetic regenerators 122 and 124 is disposed in alignment with a left first magnetic regenerator 112 between the pair of first magnetic regenerators 112 and 114, and a right second magnetic regenerator 124 between the pair of second magnetic regenerators 122 and 124 is disposed in alignment with a right first magnetic regenerator 114 between the pair of first magnetic regenerators 112 and 114. The pair of second magnetic regenerators 122 and 124 has the same structure, so hereinafter the description thereof will be described in focus on one single second magnetic regenerator 122.

As illustrated in FIG. 3B, the second magnetic regenerator 122 includes a cylinder-shaped body 122a, and an accommodation unit 122b formed inside the body 122a in a longitudinal direction of the body 122a. The accommodation unit 122b is filled with a second magnetocaloric material 172.

A connecting unit 122c is coupled to both ends of the accommodation unit 122b, respectively. The connecting unit 122c may be formed of high molecular mass compounds, such as polymer, polystyrene and the like. High molecular mass compounds, such as polymer, polystyrene and the like have high insulating efficiency since a thermal conductivity of the high molecular mass compounds is relatively higher than that of metal materials. Therefore, the heat loss generated by exchanging heat between the second magnetic regenerator 122 and the outside in the both ends of the second magnetic regenerator 122 is reduced so that a cooling capacity of the magnetic cooling apparatus 100 will be improved.

An insulation unit 122d is disposed between the body 122a and the accommodation unit 122b. The insulation unit 122d surrounds the accommodation unit 122b and may be formed of materials having low thermal conductivity, such as a polymer layer, a polystyrene layer, a vacuum layer, an air layer and the like. Therefore, the heat loss generated by exchanging heat between a cylindrical surface of the first magnetic regenerator 122 and the outside is reduced so that a cooling capacity of the magnetic cooling apparatus 100 will be improved The first magnetocaloric material 171 filled in the accommodation unit 112b of the first magnetic regenerator 112, and the second magnetocaloric material 172 filled in the accommodation unit 122b of the second magnetic regenerator 122 emit heat when a magnetic field is applied, and absorbs heat when a magnetic field is removed. Therefore, gadolinium (Gd), MnFe, which is a compound of manganese (Mn) and iron (Fe), and LaFe, which is a compound of lanthanum (La) and iron (Fe), may be used as the magnetocaloric material. These materials have a gap with excellent relative permeability to the flow of heat transfer fluid, and are excellent in the absorption and emission of heat.

The first magnetocaloric material 171 and the second magnetocaloric material 172 emit or absorb heat in a certain temperature range because of physical features thereof and have maximum amount of heat emission or absorption at a certain temperature.

Figure 4:
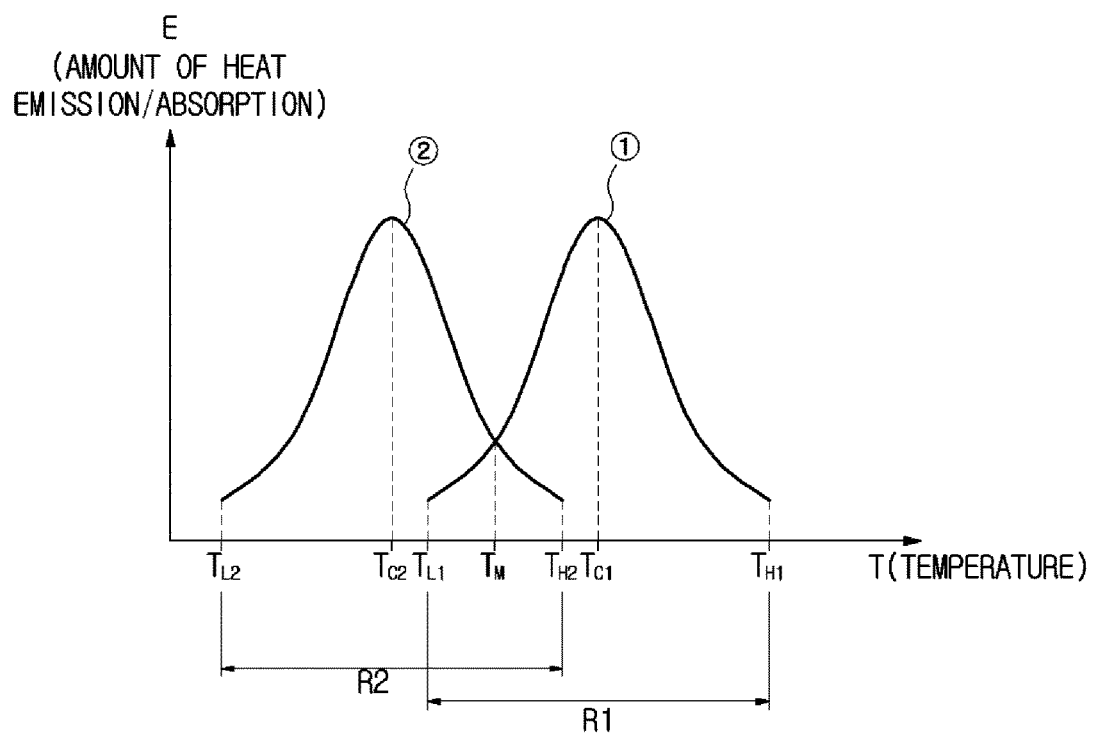
FIG. 4 is a graph illustrating amount of heat emission or absorption of magnetocaloric materials in various temperatures.

FIG. 4 is a graph illustrating amount of heat emission or absorption of magnetocaloric materials in various temperatures.

As illustrated in FIG. 4, the first magnetocaloric material 171 emits and absorbs heat in a first temperature range R1 (TL1~TH1). In the first temperature range R1, TC1 is a certain temperature at which the first magnetocaloric material 171 has a maximum amount of heat emission or absorption (hereinafter referred as a first Curie temperature).

The second magnetocaloric material 172 emits and absorbs heat in a second temperature range R2 (TL2~TH2). In the second temperature range R2, TC2 is a certain temperature at which the second magnetocaloric material 172 has a maximum amount of heat emission or absorption (hereinafter referred as a second Curie temperature). The second Curie temperature of the second magnetocaloric material 172 is relatively lower than the first Curie temperature of the first magnetocaloric material 171.

Under ideal conditions, a temperature of hot side 112a and 114a of the first magnetic regenerator 112 and 114 filled with the first magnetocaloric material 171 in steady state is the same as a maximum temperature TH1 in the first temperature range R1 and a temperature of cold side 122a and 124a of the second magnetic regenerator 122 and 124 filled with the second magnetocaloric material 172 is the same as a minimum temperature TL2 in the second temperature range R2. The description related this will be described later.

As illustrated in FIG. 2, the magnet 130 includes a pair of north pole and south pole. The magnet 130 is movable to apply or remove a magnetic field to or from the first magnetic regenerator 110 and the second magnetic regenerator 120.

The magnet 130 applies or removes a magnetic field to or from the left first magnetic regenerator 112 and the left second magnetic regenerator 122 at the same time, and applies or removes a magnetic field to or from the right first magnetic regenerator 114 and the right second magnetic regenerator 124 at the same time. When the magnetic field is applied to the left first magnetic regenerator 112 and the left second magnetic regenerator 122, the magnetic field is removed from the right first magnetic regenerator 114 and the right second magnetic regenerator 124, and when the magnetic field is applied to the right first magnetic regenerator 114 and the right second magnetic regenerator 124, the magnetic field is removed from the left first magnetic regenerator 112 and the left second magnetic regenerator 122.

The intermediate heat exchanger 160 is disposed between the first magnetic regenerating unit 110 and the second magnetic regenerating unit 120 to mediate exchanging heat between the first magnetic regenerating unit 110 and the second magnetic regenerating unit 120.

The intermediate heat exchanger 160 includes a first accommodation unit 161 disposed between the cold sides 112b and 114b of the first magnetic regenerators 112 and 114 and a second accommodation unit 162 disposed between the hot sides 122a and 124a of the second magnetic regenerators 122 and 124.

In the intermediate heat exchanger 160, the first heat transfer fluid F1 accommodated in the first accommodation unit 161 and the second heat transfer fluid F2 accommodated in the second accommodation unit 162 exchange heat. Under ideal conditions, in a steady state, temperatures of the cold sides 112b and 114b of the first magnetic regenerators 112 and 114 are the same as temperatures of the hot sides 122a and 124a of the second magnetic regenerators 122 and 124 (refer to FIG. 7). The description related this will be described later.

The magnetic cooling apparatus 100 further includes a first feed pipe 181 connecting the first magnetic regenerators 112 and 114 to the hot side heat exchanger 140, a first fluid transfer device 191 reciprocally transferring the first heat transfer fluid F1, a second feed pipe 182 connecting the second magnetic regenerators 122 and 124 to the cold side heat exchanger 150, a second fluid transfer device 192 reciprocally transferring the second heat transfer fluid F2 and a third feed pipe 183 connecting the second magnetic regenerators 122 and 124 to the second fluid transfer device 192.

The first fluid transfer device 191 and the second fluid transfer device 192 are controlled so that the first fluid transfer device 191 and the second fluid transfer device 192 are operated in conjunction with a movement of the magnet 130.

Figure 5:
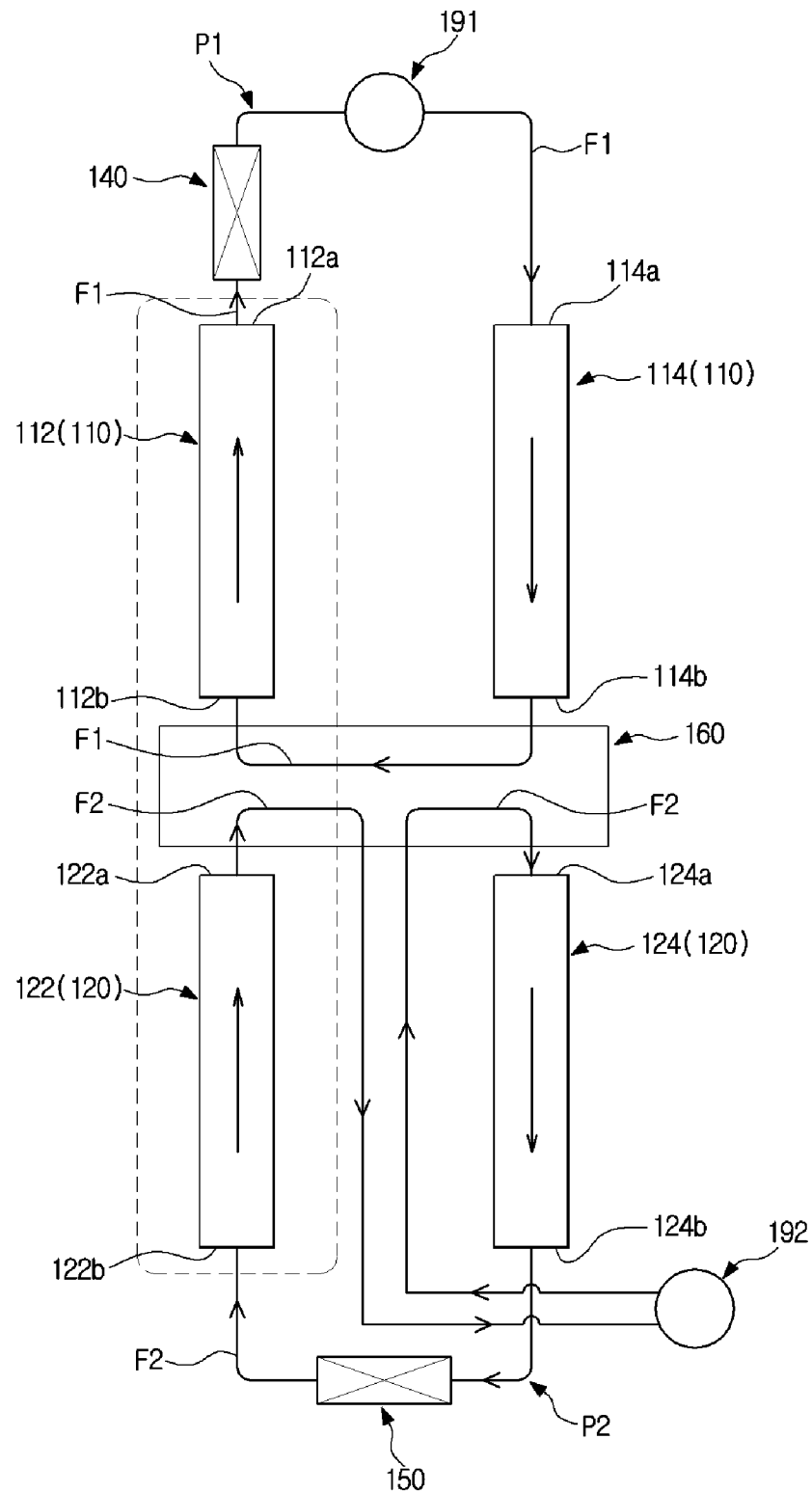
FIGS. 5 and 6 are views illustrating an operation process of the magnetic cooling apparatus in accordance with one embodiment of the present disclosure.

When the magnet 130 moves and applies the magnetic field to the left first magnetic regenerator 112 and the left second magnetic regenerator 122, and the magnetic field is removed from the right first magnetic regenerator 114 and the right second magnetic regenerator 124, the first fluid transfer device 191 and the second fluid transfer device 192 allow the first heat transfer fluid F1 and the second heat transfer fluid F2 to be transferred clockwise, as illustrated in FIG. 5.

Figure 6:
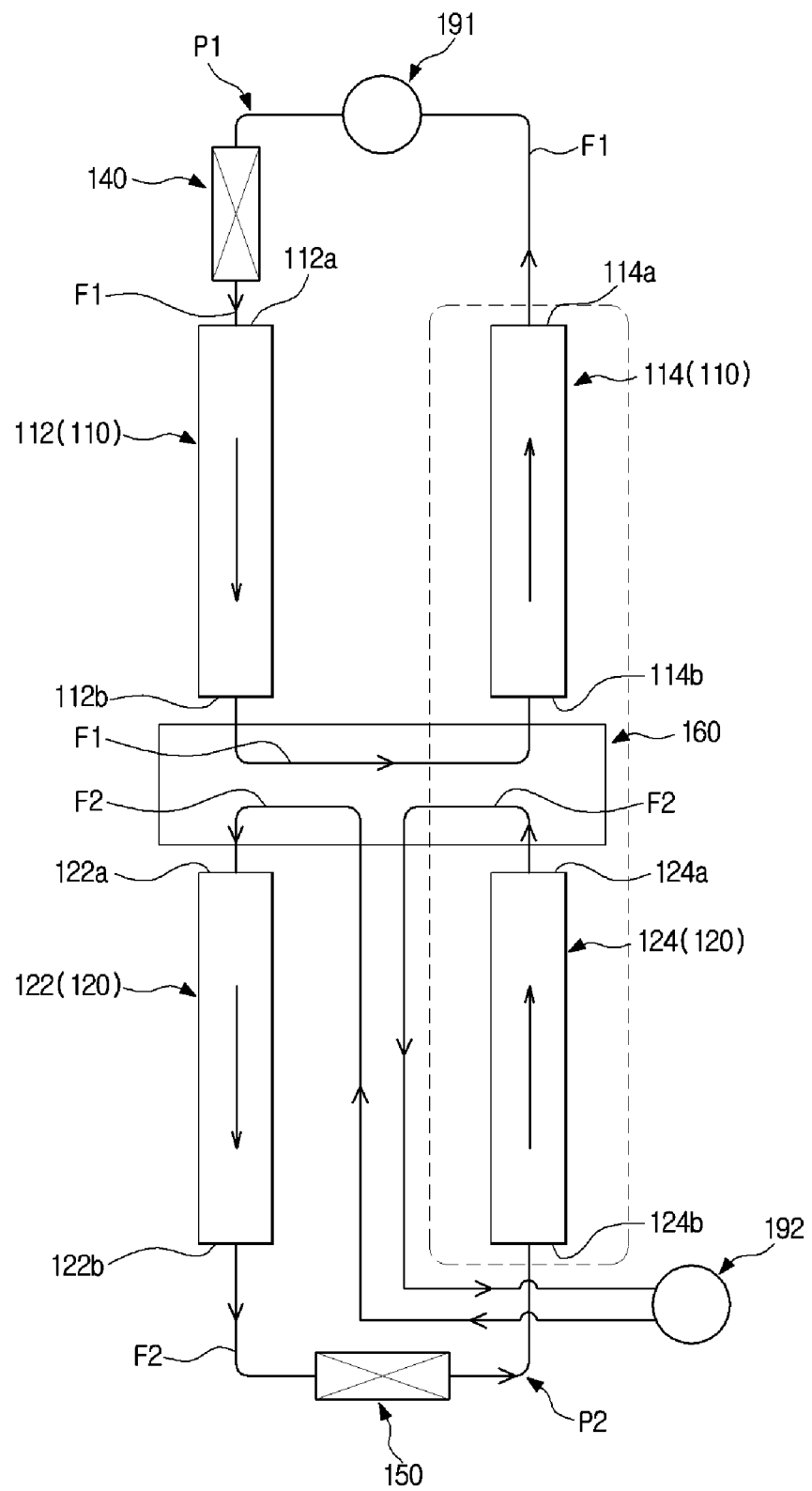

When the magnet 130 moves and applies the magnetic field to the right first magnetic regenerator 114 and the right second magnetic regenerator 124, and the magnetic field is removed from the left first magnetic regenerator 112 and the left second magnetic regenerator 122, the first fluid transfer device 191 and the second fluid transfer device 192 allow the first heat transfer fluid F1 and the second heat transfer fluid F2 to be transferred counterclockwise, as illustrated in FIG. 6.

The fluid transfer device for switching a transferring direction of the heat transfer fluid may employ a displacer or using combination of a pump generating flux and a valve switching a direction of the flux.

The first magnetic regenerating unit 110, the hot side heat exchanger 140 and the intermediate heat exchanger 160 form a first closed path P1. The first heat transfer fluid F1 is reciprocally transferred along the first closed path P1 (refer to FIG. 5).

The second magnetic regenerator 120, the cold side heat exchanger 150 and the intermediate heat exchanger 160 form a second closed path P2 (refer to FIG. 5). The second heat transfer fluid F2 is reciprocally transferred along the second closed path P2. The second closed path P2 is separated from the first closed path P1.

The first heat transfer fluid F1 and the second heat transfer fluid F2 may be water, alcohol, ethylene glycol, antifreeze, helium gas and the like, and a mixture thereof may be used. Since the second heat transfer fluid F2 is reciprocally transferred in a temperature range which is relatively lower than the first heat transfer fluid F1, the second heat transfer fluid F2 includes materials having a freezing point which is relatively lower than that of the first heat transfer fluid F1. Particularly, when the second heat transfer fluid F2 is reciprocally transferred at a temperature below zero degrees Celsius, materials which are not frozen at temperatures below zero degrees Celsius may be used.

Hereinafter, an operating process of the magnetic cooling apparatus 100 will be described.

Figure 7:
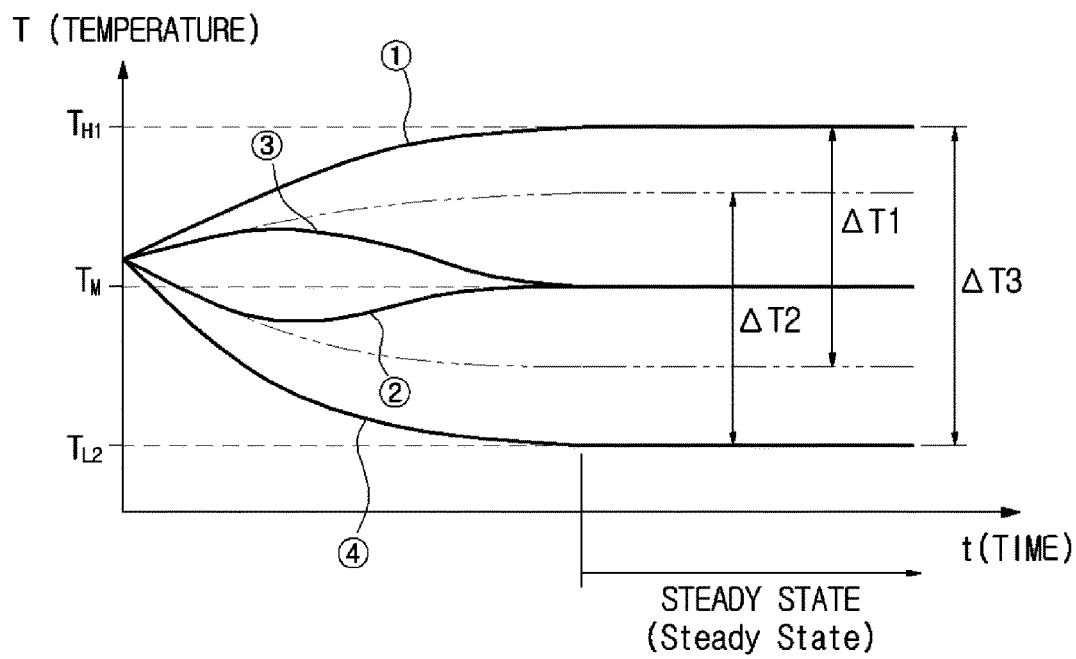
FIG. 7 is a view a graph illustrating a temperature change in a hot side and a cold side of a first magnetic regenerator and a hot side and a cold side of a second magnetic regenerator as time passes.

FIGS. 5 and 6 are views illustrating an operation process of the magnetic cooling apparatus in accordance with one embodiment of the present disclosure, and FIG. 7 is a view of a graph illustrating a temperature change in a hot side and a cold side of a first magnetic regenerator and a hot side and a cold side of a second magnetic regenerator as time passes.

As illustrated in FIG. 5, when the magnet 130 is moved to the left first magnetic regenerator 112 and the left second magnetic regenerator 122, the magnetic field is applied to the left first magnetic regenerator 112 and the left second magnetic regenerator 122 and the magnetic field is removed from the right first magnetic regenerator 114 and the right second magnetic regenerator 124. Accordingly, the first magnetocaloric material 171 placed in the left first magnetic regenerator 112 and the second magnetocaloric material 172 placed in the left second magnetic regenerator 122 generate heat and the first magnetocaloric material 171 placed in the right first magnetic regenerator 114 and the second magnetocaloric material 172 placed in the right second magnetic regenerator 124 absorb heat. The first heat transfer fluid F1 and the second heat transfer fluid F2 are transferred clockwise by the first fluid transfer device 191 and the second fluid transfer device 192.

Heat generated by the left first magnetic regenerator 112 is absorbed by the first heat transfer fluid F1. Then heat is transferred to the hot side heat exchanger 140 through the first heat transfer fluid F1 moving clockwise to be emitted. At the same time, the first heat transfer fluid F1 transfers heat in the right first magnetic regenerator 114 and absorbs heat in the intermediate heat exchanger 160 by exchanging heat with the second heat transfer fluid F2.

Heat generated by the left second magnetic regenerator 122 is absorbed by the second heat transfer fluid F2. Then heat is transferred to the intermediate heat exchanger 160 through the second heat transfer fluid F2 moving clockwise to be emitted by exchanging heat with the first heat transfer fluid F1. At the same time, the second heat transfer fluid F2 transfers heat in the right second magnetic regenerator 124 and absorbs heat in the cold side heat exchanger 150.

As illustrated in FIG. 6, when the magnet 130 is moved to the right first magnetic regenerator 114 and the right second magnetic regenerator 124, the magnetic field is applied to the right first magnetic regenerator 114 and the right second magnetic regenerator 124 and the magnetic field is removed from the left first magnetic regenerator 112 and the left second magnetic regenerator 122. Accordingly, the first magnetocaloric material 171 placed in the right first magnetic regenerator 114 and the second magnetocaloric material 172 placed in the right second magnetic regenerator 124 generate heat and the first magnetocaloric material 171 placed in the left first magnetic regenerator 112 and the second magnetocaloric material 172 placed in the left second magnetic regenerator 122 absorb heat. The first heat transfer fluid F1 and the second heat transfer fluid F2 are transferred counterclockwise by the first fluid transfer device 191 and the second fluid transfer device 192.

Heat generated by the right first magnetic regenerator 114 is absorbed by the first heat transfer fluid F1. Then heat is transferred to the hot side heat exchanger 140 through the first heat transfer fluid F1 moving counterclockwise to be emitted. At the same time, the first heat transfer fluid F1 transfer heat in the left first magnetic regenerator 112, and absorbs heat in the intermediate heat exchanger 160 by exchanging heat with the second heat transfer fluid F2.

Heat generated by the right second magnetic regenerator 124 is absorbed by the second heat transfer fluid F2. Then heat is transferred to the intermediate heat exchanger 160 through the second heat transfer fluid F2 moving counterclockwise to be emitted by exchanging heat with the first heat transfer fluid F1. At the same time, the second heat transfer fluid F2 transfers heat in the left second magnetic regenerator 122, and absorbs heat in the cold side heat exchanger 150.

As illustrated in FIG. 5, while the first heat transfer fluid F1 absorbing heat generated by the left first magnetic regenerator 112 is transferred clockwise, the first heat transfer fluid F1 transfers heat from the other end 112b of the left first magnetic regenerator 112 to one end 112a of the left first magnetic regenerator 112. As illustrated in FIG. 6, the first heat transfer fluid F1 transferring heat to the left magnetic regenerator 112 is transferred counterclockwise from the one end 112a of the left first magnetic regenerator 112 to the other end 112b of the left first magnetic regenerator 112 to decrease a temperature of the other end 112b of the left first magnetic regenerator 112. Therefore, the hot side 112a is formed the one end 112a of the left first magnetic regenerator 112, and the cold side 112b having relative lower temperature than that of the hot side 112a is formed the other end 112b of the left first magnetic regenerator 112.

This method, as mentioned above, applies to the right first magnetic regenerator 114 and the second magnetic regenerators 122 and 124. Therefore, a process in which the magnet 130 is reciprocally moved and a process in which the first heat transfer fluid F1 and the second heat transfer fluid F2 are reciprocally transferred are repeated, and thus the hot side 112a and 114a and the cold side 112b and 114b are formed on the both ends of the first magnetic regenerators 112 and 114 and the hot side 122a and 124a and the cold side 122b and 124b are formed the both ends of the second magnetic regenerators 122 and 124.

The first magnetocaloric material 171 emits and absorbs heat a first temperature range R1 (TL1~TH1) and the second magnetocaloric material 172 emits and absorbs heat a first temperature range R2 (TL2~TH2). Therefore, as illustrated in FIG. 7, when the magnetic cooling apparatus 100 reaches a steady state as a time (t) passes, temperatures of the hot sides 112a and 114a of the first magnetic regenerators 112 and 114 become the same as the maximum temperature (TH1) allowing the first magnetocaloric material 171 to emit and absorb heat, and temperatures of the cold sides 122b and 124b of the second magnetic regenerators 122 and 124 become the same as the minimum temperature (TL2) allowing the second magnetocaloric material 172 to emit and absorb heat. In addition, since the cold sides 112b and 114b of the first magnetic regenerators 112 and 114, and the hot sides 122a and 124a of the second magnetic regenerators 122 and 124 exchange heat through the intermediate heat exchanger 160, in the steady state of the magnetic cooling apparatus 100 temperatures of the cold sides 112b and 114b of the first magnetic regenerators 112 and 114 and temperatures the hot sides 122a and 124a of the second magnetic regenerators 122 and 124 become the same as TM.

The magnetic cooling apparatus 100 includes the first magnetic regenerating unit 110 and the second magnetic regenerating unit 120 both of which are using different heat transfer fluids and magnetocaloric material from each other and exchange heat with each other. Therefore, as illustrated in FIG. 7, the magnetic cooling apparatus 100 may have a temperature difference ΔT3 which is larger than a temperature difference ΔT1 between the hot side and the cold side of the single first magnetic regenerating unit 110 or a temperature difference ΔT2 between the hot side and the cold side of the single second magnetic regenerating unit 120 so that the cooling capacity may be improved.

The first magnetic regenerating unit 110 and the second magnetic regenerating unit 120 may be separately controlled. That is, operating the first magnetic regenerating unit 110 and the second magnetic regenerating unit 120 at the same time or operating the first magnetic regenerating unit 110 and the second magnetic regenerating unit 120 with a time interval may be achieved. When operating the first magnetic regenerating unit 110 and the second magnetic regenerating unit 120 at the same time, the first magnetic regenerating unit 110 and the second regenerating unit 120 may reach the steady state at the same time, and when operating the first magnetic regenerating unit 110 and the second magnetic regenerating unit 120 with a time interval, the first magnetic regenerating unit 110 may first reach the steady state and the second regenerating unit 120 may reach the steady state later.

Hereinabove, the magnetic cooling apparatus 100 having the first magnetic regenerating unit 110 and the second regenerating unit 120 in a separate manner is described, but is not limited thereto. The magnetic cooling apparatus 100 may have three magnetic regenerating units to improve the cooling capacity by making larger a temperature difference between a hot side and a cold side thereof.

Figure 8:
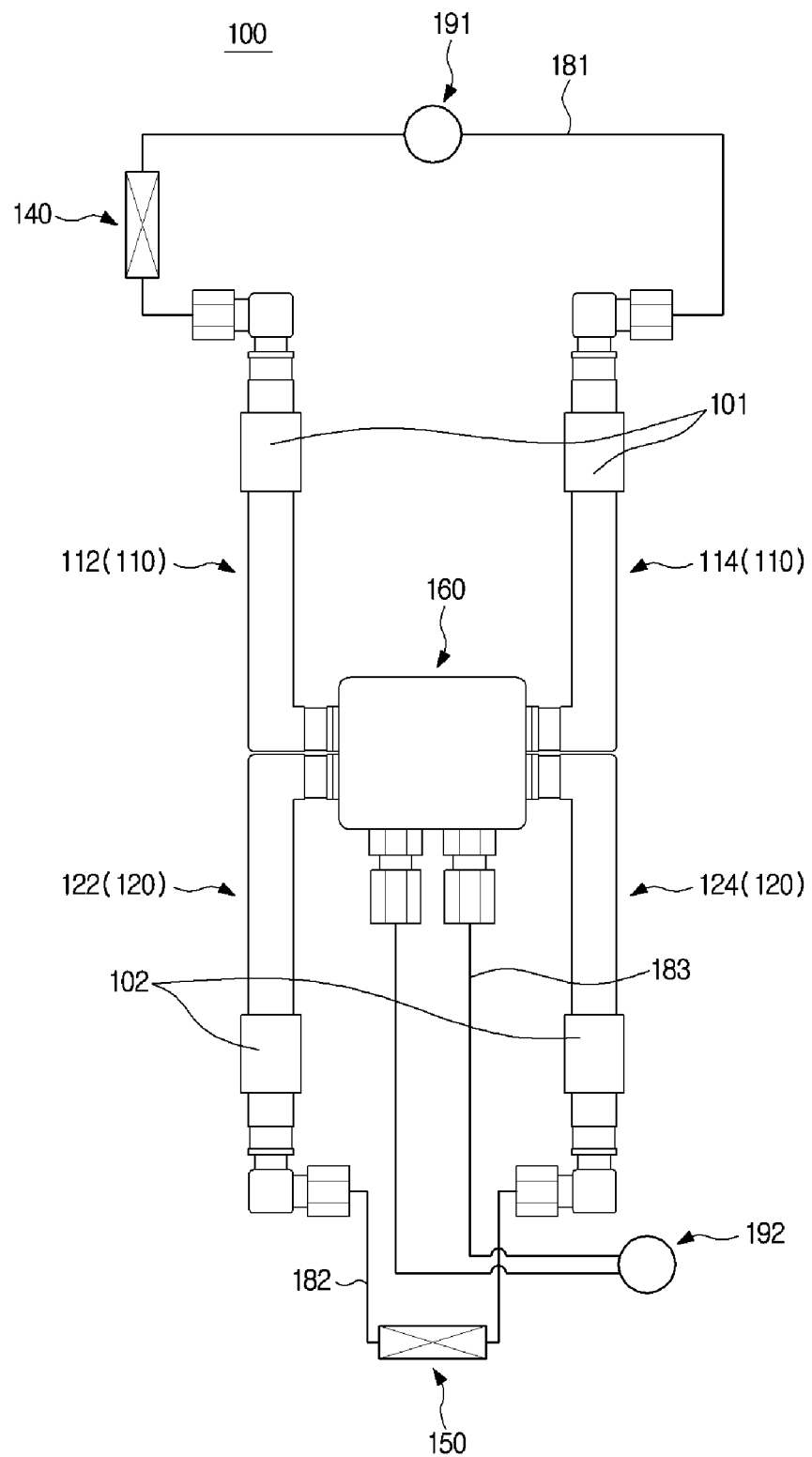
FIG. 8 is a view illustrating magnetic regenerators to which a temperature controlling device is coupled.

FIG. 8 is a view illustrating magnetic regenerators to which a temperature controlling device is coupled.

As illustrated in FIG. 8, the magnetic cooling apparatus 100 may further include temperature controlling devices 101 and 102. The temperature controlling device 101 and 102 includes first temperature controlling devices 101 coupled to an outer surface of the first magnetic regenerating units 112 and 114 and second temperature controlling devices 102 coupled to an outer surface of the second magnetic regenerating units 122 and 124. The first temperature controlling devices 101 and the second temperature controlling devices 102 may be a Peltier element.

As illustrated in FIG. 4, the first magnetocaloric material 171 and the second magnetocaloric material 172 do not always have a certain amount of heat emission or absorption within the temperature range. The first magnetocaloric material 171 has a maximum amount of heat emission or absorption at the first Curie temperature (TC1). The amount of heat emission or absorption of the first magnetocaloric material 171 becomes less as a temperature of the first magnetocaloric material 171 is more different from the first Curie temperature (TC1). The second magnetocaloric material 172 has a maximum amount of heat emission or absorption at the second Curie temperature (TC2). The amount of heat emission or absorption of the second magnetocaloric material 172 becomes less as a temperature of the second magnetocaloric material 172 is more different from the second Curie temperature (TC2).

The first temperature controlling device 101 is operated at an initial operation of the magnetic cooling apparatus 100 to form forcibly the first Curie temperature (TC1) where the first magnetocaloric material 171 has the maximum amount of heat emission or absorption so that a period time in which the first magnetic regenerating unit 110 reaches the steady state may be reduced. The same way, the second temperature controlling device 102 operates at an initial operation of the magnetic cooling apparatus 100 forcibly to form the second Curie temperature (TC2) where the second magnetocaloric material 172 has the maximum amount of heat emission or absorption so that a period time in which the second magnetic regenerating unit 120 reaches the steady state may be reduced.

The first temperature controlling devices 101 and the second temperature controlling devices 102 may emit or absorb heat according to a relation between the first Curie temperature (TC1) and the second Curie temperature (TC2), and ambient temperatures of the first magnetocaloric material 171 and the second magnetocaloric material 172 at an initial state.

For example, when ambient temperatures of the first magnetocaloric material 171 and the second magnetocaloric material 172 at an initial state of the operation of the magnetic cooling apparatus 100 are room temperature, the first Curie temperature (TC1) is higher than room temperature, and the second Curie temperature (TC2) is lower than room temperature, the first temperature controlling devices 101 may emit heat so that an ambient temperature of the first magnetocaloric material 171 is the same as first Curie temperature (TC1), and the second temperature controlling devices 102 may absorb heat so that an ambient temperature of the second magnetocaloric material 172 is the same as second Curie temperature (TC2).

As is apparent from the above description, magnetic regenerators having each heat transfer fluid are disposed to exchange heat. Therefore, a temperature difference between a hot side of one magnetic regenerator of the magnetic regenerators exchanging heat with each other and a cold side of another magnetic regenerator thereof is larger so that a cooling capacity of the magnetic cooling apparatus may be improved. In addition, heat loss at both ends of the magnetic regenerator is reduced so that the improvement of the cooling capacity of the magnetic cooling apparatus is achieved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A magnetic cooling apparatus comprising:
    a plurality of first magnetic regenerators configured to pass through a first heat transfer fluid and including a first magnetocaloric material;
    a plurality of second magnetic regenerators configured to pass through a second heat transfer fluid having a relative lower freezing point than that of the first heat transfer fluid and including a second magnetocaloric material having a relative lower Curie temperature than that of the first magnetocaloric material;
    at least one magnet configured to apply or remove a magnetic field to or from the plurality of first magnetic regenerators and the plurality of second magnetic regenerators;
    at least one hot side heat exchanger allowing the first heat transfer fluid receiving heat from the plurality of the first magnetic regenerators to emit heat;
    at least one cold side heat exchanger allowing the second heat transfer fluid transferring heat to the plurality of the second magnetic regenerators to absorb heat; and
    an intermediate heat exchanger allowing the first heat transfer fluid flowing between cold sides of the plurality of the first magnetic regenerators and the second heat transfer fluid passed through hot sides of the plurality of the second magnetic regenerators to exchange heat with each other.

2. The magnetic cooling apparatus of claim 1, further comprising:
    a first fluid transfer device disposed between the plurality of the first magnetic regenerators and reciprocally transferring the first heat transfer fluid in a first direction and a second direction opposite to the first direction; and
    a second fluid transfer device disposed between the plurality of the second magnetic regenerators and reciprocally transferring the second heat transfer fluid in a first direction and a second direction opposite to the first direction.

3. The magnetic cooling apparatus of claim 1, wherein the first heat transfer fluid and the second heat transfer fluid are transferred in directions opposite to each other in the intermediate heat exchanger.

4. The magnetic cooling apparatus of claim 1, wherein the plurality of first magnetic regenerators is provided in a pair arranged in parallel to each other, and the plurality of second magnetic regenerators is provided in a pair arranged in parallel to each other, wherein one of a pair of the first magnetic regenerators and one of a pair of the second magnetic regenerators are disposed in a row and the other of the pair of the first magnetic regenerators and the other of the pair of the second magnetic regenerators are disposed in a row.

5. The magnetic cooling apparatus of claim 4, wherein the magnet applies or removes a magnetic field to or from both of the first magnetic regenerator and the second magnetic regenerator arranged in a row.

6. The magnetic cooling apparatus of claim 5, wherein the first heat transfer fluid is transferred in the first direction when a magnetic field is simultaneously applied to the first magnetic regenerator and the second magnetic regenerator arranged in a row, and the first heat transfer fluid is transferred in the second direction opposite to the first direction when a magnetic field is simultaneously removed from the first magnetic regenerator and the second magnetic regenerator arranged in a row.

7. The magnetic cooling apparatus of claim 1, wherein the first magnetic regenerator comprises an accommodation unit in which the first magnetocaloric material is accommodated, a connecting unit communicating with both ends of the accommodation unit to allow the first heat transfer fluid to flow toward inside the accommodation unit and at least one insulation unit configured to surround the accommodation unit to reduce exchanging heat between an outside of the first magnetic regenerator and the accommodation unit.

8. The magnetic cooling apparatus of claim 7, wherein the insulation unit comprises at least one of a polymer layer, a polystyrene layer, a vacuum layer, and an air layer.

9. The magnetic cooling apparatus of claim 7, wherein the connecting unit is formed of at least one of a polymer and polystyrene.

10. The magnetic cooling apparatus of claim 1, further comprising:
    a first temperature controlling device coupled to an outer surface of the first magnetic regenerator to apply heat to the first magnetocaloric material; and a second temperature controlling device coupled to an outer surface of the second magnetic regenerator to absorb heat from the second magnetocaloric material.

11. The magnetic cooling apparatus of claim 10, wherein the first temperature controlling device and the second temperature controlling device is a Peltier element.

12. A magnetic cooling apparatus comprising:
a first magnetic regenerating unit provided with a plurality of first magnetic regenerators including a first magnetocaloric material,
a second magnetic regenerating unit provided with a plurality of second magnetic regenerators including a second magnetocaloric material having a different Curie temperature from a Curie temperature of the first magnetocaloric material,
at least one magnet configured to apply or remove a magnetic field to or from the plurality of first magnetic regenerators and the plurality of second magnetic regenerators; and
an intermediate heat exchanger disposed between the first magnetic regenerating unit and the second magnetic regenerating unit to allow the first magnetocaloric material and the second magnetocaloric material to exchange heat.

13. The magnetic cooling apparatus of claim 12, wherein the intermediate heat exchanger is disposed between a cold side of the first magnetic regenerating unit and a hot side of the second magnetic regenerating unit.

14. The magnetic cooling apparatus of claim 13, wherein the first magnetic regenerating unit and the second magnetic regenerating unit are separately controlled.

15. The magnetic cooling apparatus of claim 12, wherein the first heat transfer fluid and the second heat transfer fluid are transferred in directions opposite to each other.

16. A magnetic cooling apparatus comprising:
a magnetic regenerator configured to flow heat transfer fluid; and
a magnet configured to apply or remove a magnetic field to or from the magnetic regenerator,
wherein the magnetic regenerator comprises an accommodation unit in which magnetocaloric material emitting heat when a magnetic is applied and absorbing heat when a magnetic field is removed is accommodated, a connecting unit communicating with both ends of the accommodation unit to allow the heat transfer fluid to be introduced to the inside of the accommodation unit, and at least one insulation unit configured to surround the accommodation unit to reduce exchanging heat between the outside of the magnetic regenerator and the accommodation unit.

17. The magnetic cooling apparatus of claim 16, wherein the insulation unit comprises at least one of a polymer layer, a polystyrene layer, a vacuum layer, and an air layer.

18. The magnetic cooling apparatus of claim 16, wherein the connecting unit is formed of at least one of a polymer and polystyrene.

19. A magnetic cooling apparatus comprising:
a magnetic regenerator configured to flow heat transfer fluid; and
a magnet configured to apply or remove a magnetic field to or from the magnetic regenerator,
wherein the magnetic regenerator comprises a body, an accommodation unit in which magnetocaloric material emitting heat when a magnetic is applied and absorbing heat when a magnetic field is removed is accommodated, a connecting unit communicating with both ends of the accommodation unit to allow the heat transfer fluid to be introduced to the inside of the accommodation unit, and at least one temperature controlling device coupled to the outer surface of the body to apply or remove heat to or from the magnetocaloric material.

20. The magnetic cooling apparatus of claim 19, wherein the temperature controlling device is a Peltier element.

* * * * *